June 12, 1956 V. L. HARSH 2,749,693
LAWN TOOL
Filed Nov. 12, 1952
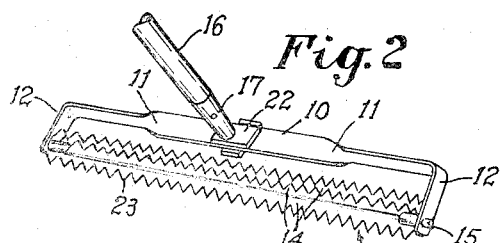
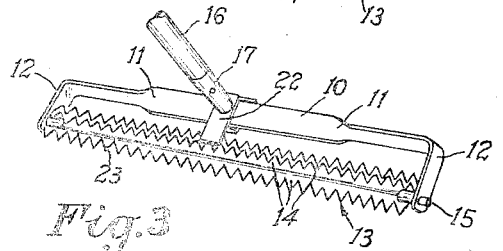
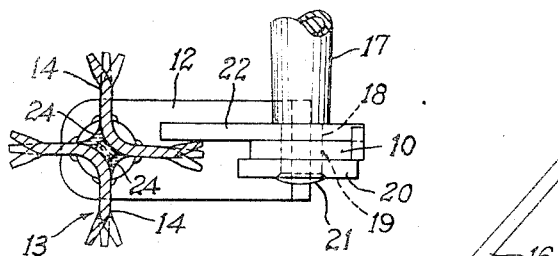
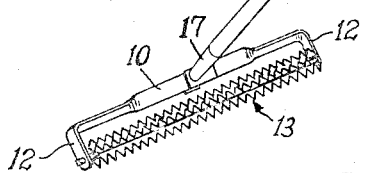
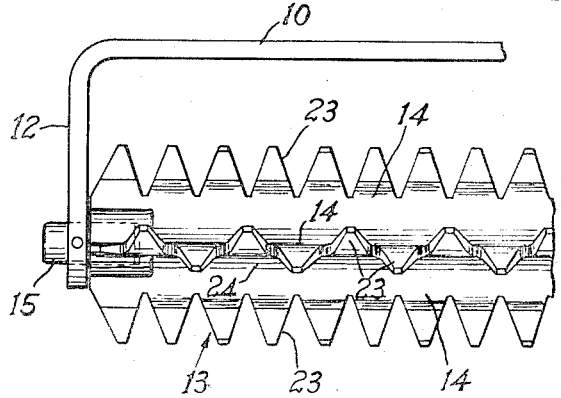
INVENTOR.
Victor L. Harsh
BY Frease & Bishop
ATTORNEYS

United States Patent Office 2,749,693
Patented June 12, 1956

2,749,693
LAWN TOOL

Victor L. Harsh, Canton, Ohio

Application November 12, 1952, Serial No. 319,863

2 Claims. (Cl. 55—24)

The invention relates to soil cultivating tools, and more particularly to a tool for crushing lumps of soil and leveling uneven surfaces preparatory to making a new lawn, and the present application is a continuation in part of my copending application, Serial No. 302,160, filed August 1, 1952, now abandoned.

An object of the invention is to provide a tool having a rotary pulverizing member, provided with a plurality of blades, adapted to be rolled back and forth over the soil.

Another object is to provide such a tool in which the rotary pulverizing member is mounted in a frame having a handle whereby the tool may be manipulated in a manner similar to the ordinary rake.

A further object is to provide a tool of the character referred to in which means is provided for locking the rotary pulverizing member against rotation.

A still further object is to provide saw teeth upon the edges of the blades of the rotary pulverizing member.

Another object is to provide such a rotary pulverizer in which the saw teeth upon adjacent blades are staggered relative to each other.

A further object is to provide a rotary pulverizing of this type in which the saw teeth on each blade are alternately bent in opposite directions.

The above objects together with others which will be apparent from the drawing and following description, or which may be later referred to, may be attained by constructing the improved tool in the manner hereinafter described in detail and illustrated in the accompanying drawing, in which:

Fig. 1 is a perspective view of the lawn tool to which the invention pertains, showing the manner in which it is used;

Fig. 2 an enlarged perspective view of the frame and rotary pulverizing member;

Fig. 3 a view similar to Fig. 2, the rotary pulverizing member being locked against rotation;

Fig. 4 a further enlarged end elevation of the tool, with parts broken in section; and, Fig. 5 an enlarged fragmentary elevation of one end portion of the rotary pulverizer.

Referring now more particularly to the embodiment of the invention illustrated, in which similar numerals refer to similar parts throughout, the improved tool includes a primary, or main, frame 10 of generally U-shape. This frame, as shown, may be formed from a flat metal bar, each end portion of which is axially twisted at right angles, as indicated at 11, and terminates in an angular leg 12.

A rotary pulverizing member, indicated generally at 13, is journalled in the frame 10. This member is in the form of four blades 14, located at 90 degrees to each other, and journals 15 are formed at opposite ends thereof and juornalled within the angular legs 12 of the frame, so that the member 13 may be freely rotatbale therein.

The rotary member 13 may be formed from a plurality of metal plates welded together to form the blades, or may be cast, forged or otherwise produced.

A handle 16, generally similar to the handles provided for rakes and similar tools, may be attached to the frame 10 for manipulating the tool. This handle may be provided at its lower end with a metal ferrule 17, which may be attached to the frame 10 in any suitable manner.

For the purpose of providing means for locking the rotary member 13 against rotation, the handle may be rotatably mounted within the frame 10. For this purpose the ferrule may be reduced in diameter, as at 18, and located through a suitable opening 19 in the frame 10 and then passed through the plate 20 located below the frame 10 and riveted, as at 21.

A latch plate 22 is fixed to the ferrule 17 of the handle and adapted to be normally located in the position best shown in Fig. 2 extending longitudinally of the frame. When it is desired to lock the rotary pulverizing member 13 against rotation, the handle is rotated 90 degrees upon its axis, engaging the latch plate 22 over one of the blades 14 of the rotary member 13 as shown in Figs. 3 and 4, thus preventing rotation of the member 13.

The edges of the blades 14 of the rotary pulverizing member 13, are preferably provided with V-shape or saw teeth 23, for the purpose of more readily breaking up lumps and clods of soil. These teeth are preferably alternately bent, in opposite directions, as shown in Figs. 4 and 5, in order to prevent soil from clogging the teeth. For the purpose of uniformly pulverizing the soil, the teeth 23 upon each blade 14 are preferably staggered relative to the teeth on adjacent blades, and, as shown in the drawing, all of the teeth 23 are sharpened.

In order to prevent earth from loading or packing between the blades 23 of the rotary pulverizer, fillets 24 may be located in the angles between adjacent blades.

In the operation of the tool, the handle 16 is grasped in the hands, as shown in Fig. 1, holding the tool in such position that the rotary pulverizing member 13 is in contact with the soil, and as the tool is moved back and forth over the soil the rotary member 13 will rotate thereover, the teeth 23 thereon breaking up and crushing large size lumps of soil, and uniformly pulverizing the same.

In order to level uneven surfaces in the soil the handle 16 may be turned to lock the rotary member 13 against rotation, so that it will act as a scraper to level the soil.

After the soil has been pulverized and levelled as above described, grass seed may be broadcast and the tool again moved over the soil, the rotary pulverizer 13 working the seed into the soil.

Although the tool is above described as for use in making up a lawn, it should be understood that it is equally efficient in preparing flower beds and the like, where a level surface of pulverized soil is desirable.

From the above it will be obvious that a simple, inexpensive and efficient tool is provided which may be easily operated to pulverize soil preparatory to forming a lawn, flower bed or the like, and to level uneven surfaces in the soil, as well as to work grass seed into the pulverized soil.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and use of preferred embodiments thereof, and the advantageous new and useful re- suits obtained thereby; the new and useful constructions, and reasonable mechanical equivalents thereof obvious to those skilled in the art, are set forth in the appended claims.

I claim:

1. A portable hand cultivating tool comprising a generally U-shape frame, a handle connected to the frame, a rotary pulverizing member journalled in the frame, said rotary member having a plurality of radial blades coextensive therewith, the teeth on each blade being alternately bent on opposite sides of the plane of the blade, and a latch plate pivotally mounted upon the handle at the junction of the handle with the frame and adapted to be rotated into engagement with one of the blades for locking the rotary member against rotation.

2. A portable hand cultivating tool comprising a generally U-shape frame, a handle connected to the frame, said handle being of sufficient length to be held in the hands of a person standing upright to manipulate the tool upon the ground, a rotary pulverizing member journalled in the frame, said rotary member having a plurality of radial blades coextensive therewith, the teeth on each blade being alternately bent on opposite sides of the plane of the blade, and a latch plate pivotally mounted upon the handle at the junction of the handle with the frame and adapted to be rotated into engagement with one of the blades for locking the rotary member against rotation.

References Cited in the file of this patent

UNITED STATES PATENTS

| | | |
|---|---|---|
| 828,575 | Schilling | Aug. 14, 1906 |
| 874,538 | Powell | Dec. 24, 1907 |
| 1,507,988 | Cyganczuk | Sept. 9, 1924 |
| 1,786,455 | Robbins | Dec. 30, 1930 |